(12) United States Patent
Reed et al.

(10) Patent No.: US 10,203,196 B2
(45) Date of Patent: Feb. 12, 2019

(54) INSPECTING ONE OR MORE APERTURES OF A COMPONENT USING MOLDABLE MATERIAL

(71) Applicant: United Technologies Corporation, Hartford, CT (US)

(72) Inventors: Gordon M. Reed, Plantsville, CT (US); James Romanelli, Colchester, CT (US); James M. Koonankeil, Marlborough, CT (US); Kevin J. Klinefelter, Uncasville, CT (US); Markus W. Fritch, Manchester, CT (US); Kenneth J. Hollman, Meriden, CT (US); Jeffrey S. Beattie, South Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 569 days.

(21) Appl. No.: 14/770,753

(22) PCT Filed: Feb. 25, 2014

(86) PCT No.: PCT/US2014/018370
§ 371 (c)(1),
(2) Date: Aug. 26, 2015

(87) PCT Pub. No.: WO2014/134057
PCT Pub. Date: Sep. 4, 2014

(65) Prior Publication Data
US 2016/0003607 A1 Jan. 7, 2016

Related U.S. Application Data

(60) Provisional application No. 61/770,185, filed on Feb. 27, 2013.

(51) Int. Cl.
*G01B 11/00* (2006.01)
*G01B 21/20* (2006.01)
(Continued)

(52) U.S. Cl.
CPC .............. *G01B 11/00* (2013.01); *G01B 11/24* (2013.01); *G01B 21/20* (2013.01); *G01M 13/00* (2013.01)

(58) Field of Classification Search
CPC ....................................................... G01B 11/24
See application file for complete search history.

(56) References Cited

U.S. PATENT DOCUMENTS

| 5,221,500 A | 6/1993 | Gent et al. |
| 5,792,392 A * | 8/1998 | Maus ................. B29C 45/376 264/2.2 |

(Continued)

FOREIGN PATENT DOCUMENTS

WO    WO-2013127710 A1 *  9/2013  ............. G01B 11/24

*Primary Examiner* — Timothy Kennedy
(74) *Attorney, Agent, or Firm* — O'Shea Getz P.C.

(57) ABSTRACT

A method is provided for inspecting at least one aperture of a component with curable material and an inspection system. At least a portion of the curable material is injected into the aperture. The curable material conforms to at least a portion the aperture and subsequently cures and forms a mold of at least a portion of the aperture. The mold is removed from the aperture. At least a portion of a geometry of the mold is compared to at least a portion of a geometry of a reference model for the aperture using the inspection system.

17 Claims, 6 Drawing Sheets

(51) Int. Cl.
 *G01B 11/24* (2006.01)
 *G01M 13/00* (2006.01)

(56) References Cited

U.S. PATENT DOCUMENTS

| | | |
|---|---|---|
| 6,271,924 B1 | 8/2001 | Ngoi |
| 7,327,857 B2 | 2/2008 | Lloyd, Jr. |
| 7,463,368 B2 | 12/2008 | Morden |
| 7,574,035 B2 | 8/2009 | Koonankeil |
| 7,578,178 B2 | 8/2009 | Boyer et al. |
| 2002/0031847 A1 | 3/2002 | Akram |
| 2003/0155636 A1 | 8/2003 | Cobbley et al. |
| 2006/0209292 A1 | 9/2006 | Dowski et al. |
| 2009/0033947 A1 | 2/2009 | Boyer |
| 2010/0206462 A1 | 8/2010 | Binkley |
| 2010/0296725 A1 | 11/2010 | Seiffert |
| 2015/0000387 A1* | 1/2015 | Jiang ............... G01B 11/24 73/112.01 |

\* cited by examiner

INSPECTING ONE OR MORE APERTURES OF A COMPONENT USING MOLDABLE MATERIAL

This application claims priority to PCT Patent Appln. No. PCT/US14/18370 filed Feb. 25, 2014, which claims priority to U.S. Patent Appln. No. 61/770,185 filed Feb. 27, 2013.

BACKGROUND OF THE INVENTION

1. Technical Field

This disclosure relates generally to inspecting a component and, more particularly, to inspecting one or more apertures of a component with an electronic measurement device.

2. Background Information

A typical rotor blade for a turbine engine includes an airfoil with a plurality of cooling holes. Each of these cooling holes may have a relatively complex geometry. During manufacture, one or more of the cooling holes may each be inspected with a contact or non-contact measurement device to determine whether that cooling hole was formed in accordance with a cooling hole geometry as specified in a design for the rotor blade. A portion of the airfoil, for example, may be ground down and a location and a diameter of the cooling hole along its axis may be measured. After many iterations of this process, data corresponding to the measured locations and diameters along the cooling hole axis may be compiled to generate a geometric model of that cooling hole. Such a method, however, may be relatively time consuming and expensive to perform. In addition, such a method destroys the rotor blade during the inspection of the rotor blade.

There is a need in the art for an improved method for inspecting a component.

SUMMARY OF THE DISCLOSURE

According to an aspect of the invention, a method is provided for inspecting at least one aperture of a component with curable material and an inspection system. At least a portion of the curable material is injected into the aperture. The curable material conforms to at least a portion of the aperture and subsequently cures and forms a mold of at least a portion of the aperture. The mold is removed from the aperture. At least a portion of a geometry of the mold is compared to at least a portion of a geometry of a reference model for the aperture using the inspection system.

According to another aspect of the invention, a method is provided for inspecting at least one cooling hole of a turbine engine component with moldable material and an inspection system. At least a portion of the moldable material is directed into the cooling hole of the turbine engine component. The moldable material conforms to at least a portion of the cooling hole and subsequently changes phase from a fluid to a solid. A volume of the moldable material as the fluid is substantially equal to a volume of the moldable material as the solid. The moldable material therefore forms a mold of the at least a portion of the cooling hole of the turbine engine component. The mold is removed from the cooling hole. At least a portion of a geometry of the mold is compared to at least a portion of a geometry of a reference model for the aperture using the inspection system.

According to another aspect of the invention, a method is provided for inspecting at least one cooling hole of a turbine engine component with curable material and an inspection system. At least a portion of the curable material is injected into the cooling hole of the turbine engine component. The curable material conforms to at least a portion of the cooling hole and subsequently cures and forms a mold of at least a portion of the cooling hole. The mold is removed from the cooling hole of the turbine engine component. At least a portion of a surface geometry of the mold is mapped with the inspection system to provide map data.

According to still another aspect of the invention, a kit is provided for inspecting an aperture of a component. The kit includes curable material and a device for injecting the curable material into the aperture. The kit also includes a device or system for creating a map of at least a portion of a surface geometry of the curable material after curing, an electronically readable reference model of the aperture, and a device or system for comparing the electronically readable reference model against the map.

The method may include comparing the map data to data from a reference model for the cooling hole to compare at least a portion of a geometry of the cooling hole to at least a portion of a geometry of the reference model.

The moldable material may be configured as or otherwise include curable material.

The method may include determining whether a meter portion of the aperture is aligned with a diffuser portion of the aperture based on the comparison.

The method may include determining whether there is a ridge at a junction between a meter portion of the aperture and a diffuser portion of the aperture based on the comparison.

The method may include forming a base with a first portion of the curable material on a surface of the component, where the aperture extends into the component from the surface. The step of injecting may include a step of injecting a second portion of the curable material into the aperture. The mold may be removed from the aperture using the base.

The method may include injecting a third portion of the curable material into a second aperture of the component. The curable material may conform to at least a portion of the second aperture and form a second mold of at least a portion of the second aperture. The method may also include comparing at least a portion of a geometry of the second mold to at least a portion of a geometry of a second reference model for the second aperture using the inspection system.

The method may include metering the curable material that is injected into the aperture.

The step of comparing may include mapping at least a portion of a surface geometry of the mold with a measurement device to provide map data, and comparing the map data to reference data from the reference model using a processing device. The inspection system may include the measurement device and the processing device.

The measurement device may be configured as or otherwise include a non-contact measurement device. The non-contact measurement device may be configured as or otherwise include a full spectrum light measurement device, a monochromatic light measurement device, a laser measurement device, a computed axial tomography scanning device, and/or an interferometry device.

The component may be configured as or otherwise include a component for a turbine engine. The turbine engine component may be configured as or otherwise include a rotor blade. The aperture may be configured as or otherwise include a cooling hole located in an airfoil of the rotor blade.

The curable material may be configured as or otherwise include a viscous liquid and a viscoelastic fluid. The curable material may also or alternatively be configured as or otherwise include a self-curing material.

The cured material may be configured as or otherwise include a resilient solid.

A volume of the curable material may be substantially equal to a volume of the cured material.

The kit may include instructions for removing the curable material from the aperture after the curable material has cured.

The foregoing features and elements may be combined in various combinations without exclusivity, unless expressly indicated otherwise. The foregoing features and the operation of the invention will become more apparent in light of the following description and the accompanying drawings.

DETAILED DESCRIPTION OF THE INVENTION

The present invention includes systems and methods for inspecting one or more apertures of a turbine engine component, or any other type of component. The turbine engine component may be a rotor blade such as, for example, a compressor blade or a turbine blade. Alternatively, the turbine engine component may be a stator blade, a guide vane, a combustor wall panel, or any other type of turbine engine component with one or more apertures. One or more of the apertures may each be a cooling hole such as, for example, an effusion hole, an impingement hole, etc. Alternatively, one or more of the apertures may each be a fastener aperture (e.g., bolt hole), or any other type of aperture that extends into or through the turbine engine component.

Figure 1:
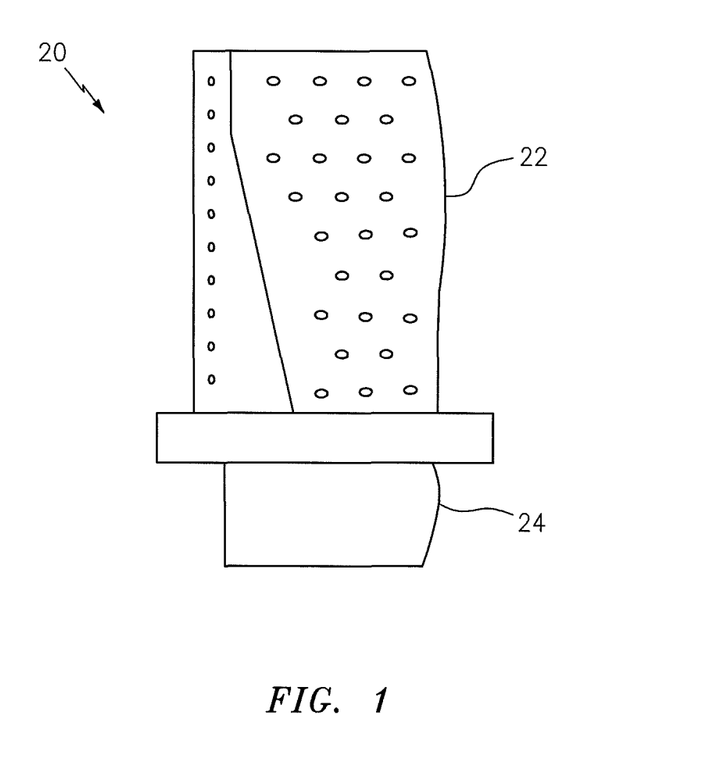
FIG. 1 is an illustration of a rotor blade for a turbine engine.
Figure 2:
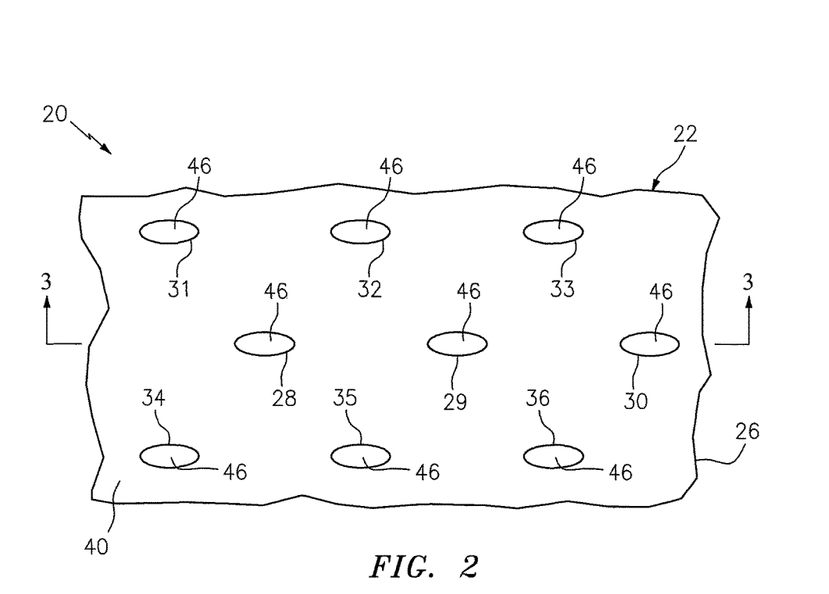
FIG. 2 is an enlarged illustration of a portion of the rotor blade of FIG. 1.
Figure 3:
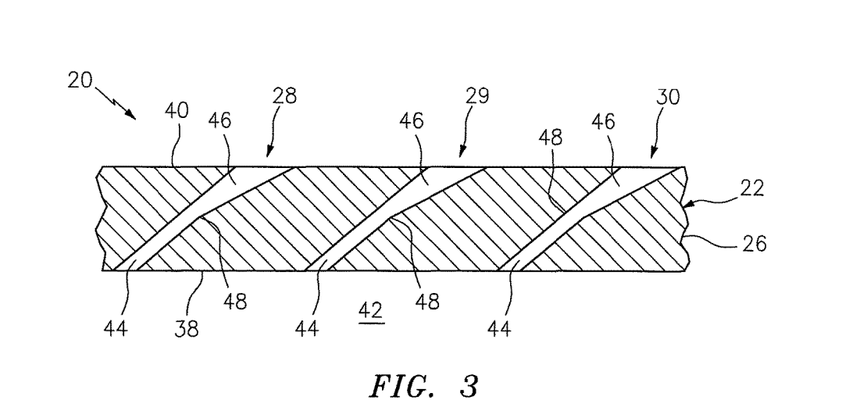
FIG. 3 is a sectional illustration of the portion of the rotor blade of FIG. 2.

FIG. 1 illustrates a turbine engine component configured as a rotor blade 20. The rotor blade 20 includes a blade airfoil 22 that is connected to (e.g., formed integral with or attached to) a blade root 24. Referring to FIGS. 2 and 3, the airfoil 22 includes an airfoil wall 26 with one or more cooling holes 28-36. The wall 26 includes an interior surface 38 and an exterior surface 40. The interior surface 38 may define at least a portion of an interior cavity 42 of the airfoil 22, or alternatively a microcircuit passage or plenum that is disposed within the wall 26. The exterior surface 40 may at least partially define a leading edge, a trailing edge, a pressure side surface or a suction side surface of the airfoil 22.

Referring to FIG. 3, one or more of the cooling holes 28-36 each extends through the wall 26 between the interior surface 38 and the exterior surface 40. One or more of the cooling holes 28-36 may each include a meter portion 44 and a diffuser portion 46, which is fluidly coupled with the meter portion 44 at a junction 48. The meter portion 44 extends into the wall 26 from the interior surface 38 to the diffuser portion 46. The diffuser portion 46 extends into the wall 26 from the exterior surface 40 to the meter portion 44. The meter portion 44 may have a substantially uniform (e.g., cylindrical) geometry. In contrast, the diffuser portion 46 may have a (e.g., tapered cylindrical) geometry that tapers as the diffuser portion 46 extends from the exterior surface 40 towards the meter portion 44.

Figure 4:
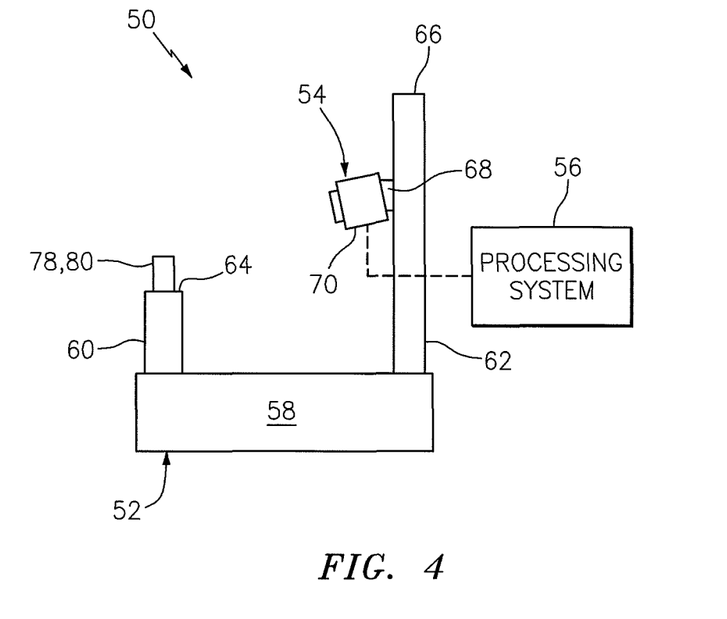
FIG. 4 is an illustration of a system for inspecting a component.

FIG. 4 illustrates a system 50 for inspecting one or more apertures of a component such as the rotor blade 20 of FIG. 1. The inspection system 50 includes a support stand 52, an electronic measurement device 54 and a processing system 56.

The support stand 52 includes a base 58, a component support 60 and a device support 62. The component support 60 extends from the base 58 to a component support surface 64. The device support 62 extends from the base 58 to a distal end 66. The device support 62 includes a device mount 68 that attaches the measurement device 54 to the device support 62. The device mount 68 is located between the base 58 and the end 66.

The measurement device 54 is configured as a non-contact measurement device. Examples of such a non-contact measurement device include, but are not limited to, a full spectrum (e.g., white) light measurement device, a monochromatic (e.g., blue) light measurement device, a laser measurement device, and a computed axial tomography scanning (CAT scan) device. Another example of a non-contact measurement device is an interferometry device, which projects and measures changes (e.g., phase shifts) in a pattern of waves (e.g., electromagnetic waves). In alternative embodiments, however, the measurement device 54 may be configured as a contact measurement device such as, for example, a coordinate measuring machine (CMM).

Figure 5:
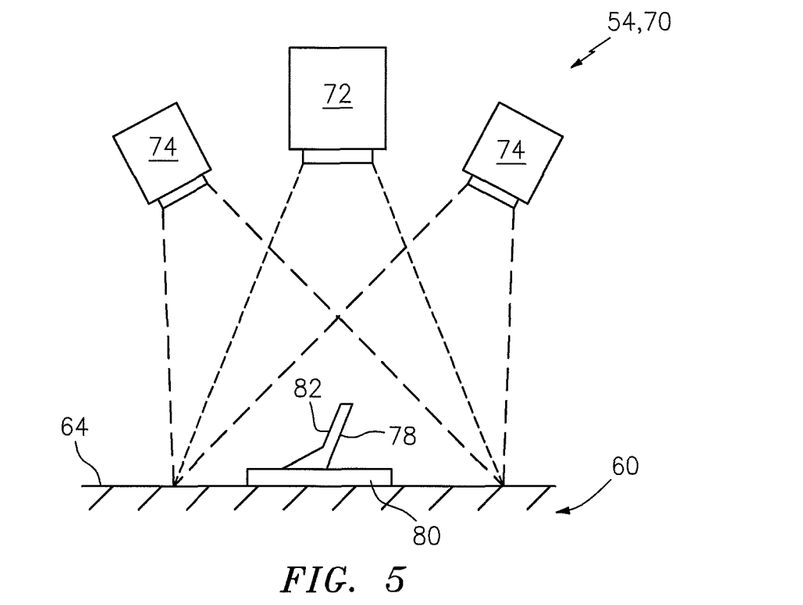
FIG. 5 is an illustration of a measurement device for the inspection system of FIG. 4.

The measurement device 54 of FIG. 4 includes a non-contact sensor 70 (e.g., a white light optical scanner) that is adapted to map at least a portion of a part; e.g., a mold of one or more of the cooling holes 28-36. The term "map" may describe a process of applying a (e.g., high density) triangulated mesh of surface data points to a part surface. Referring to FIG. 5, the non-contact sensor 70 may include a fringe pattern projector 72 and one or more cameras 74. The projector 72 is adapted to project a point, line and/or pattern of light (e.g., white light). One or more of the cameras 74 are each adapted to capture an image of the projected light.

Referring again to FIG. 4, the processing system 56 is in signal communication (e.g., hardwired or wirelessly connected) with the measurement device 54. The processing system 56 may be implemented with hardware, software or a combination of hardware and software. The processing system 56 may include one or more processors, memory, analog and/or digital circuitry, etc.

Figure 6:
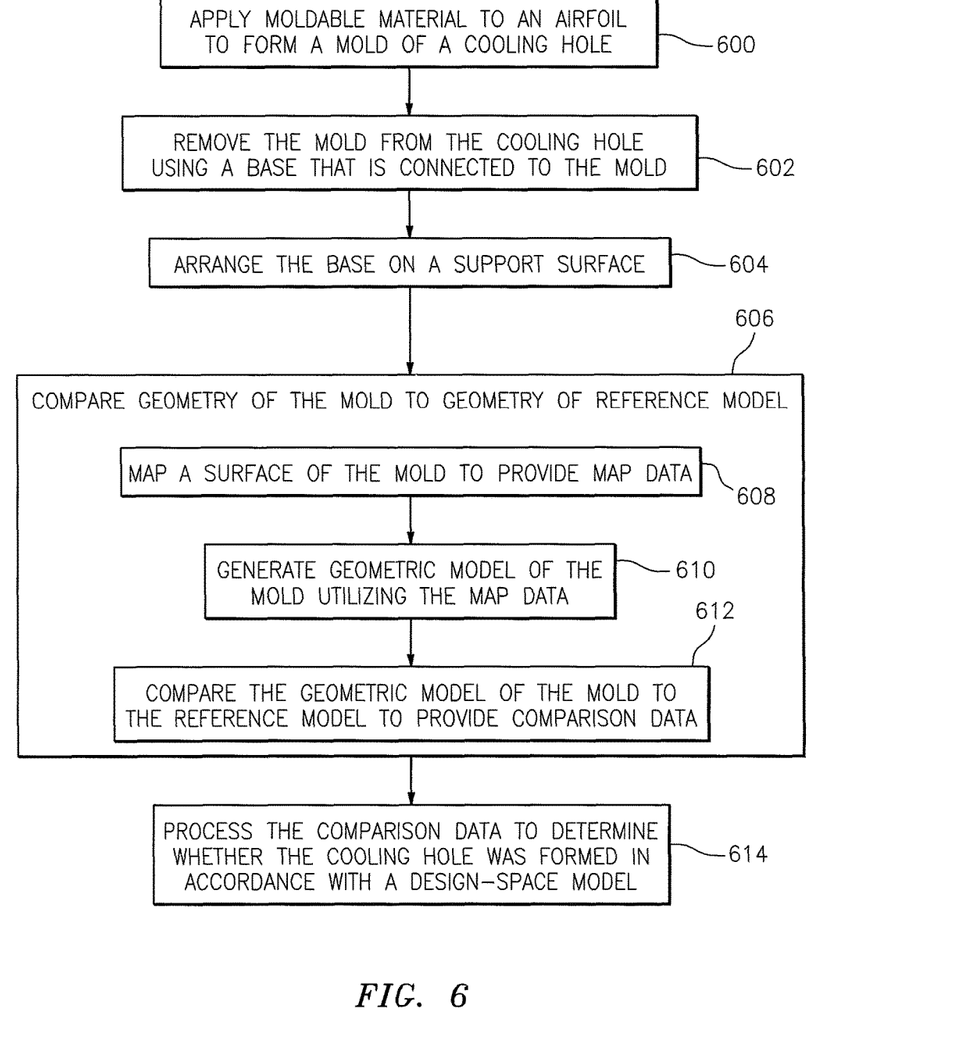
FIG. 6 is a flow diagram of a method for inspecting an aperture of a component with a moldable material and an inspection system.

FIG. 6 is a flow diagram of a non-destructive method for inspecting one or more apertures of a turbine engine component with moldable material and an inspection system. For ease of description, this method is described below for inspecting the airfoil 22 of FIGS. 2 and 3 using the inspection system 50 of FIG. 4. However, the present method may be performed for inspecting any turbine engine component type and/or configuration with any inspection system type and/or configuration. The present method may also or alternatively be performed for inspecting one or more apertures in various components other than those included in a turbine engine.

The moldable material may be a curable material such as, for example, a self-curing and/or air curing material. The moldable material may be a fluid in its uncured state and a solid in its cured state. The moldable material, for example, may be a relatively viscous liquid or a viscoelastic fluid (e.g., a gel) in its uncured state. The moldable material may be a resilient (e.g., rubber like) solid in its cured state. The moldable material, however, may have substantially equal volumes in both its uncured and cured states. The moldable material therefore may cure without substantially expanding or contracting in volume; e.g., expanding or contracting less than about one tenth of one percent (0.1%). Examples of such moldable material include those multi-part curable materials used to make dental impressions, which may include silica-amorphous, vinyl dimethyl poly-dimethyl siloxane, and dimethyl-methylhydrogenpolysiloxane. The present invention, however, is not limited to any particular moldable material types or chemical components.

Figure 7:
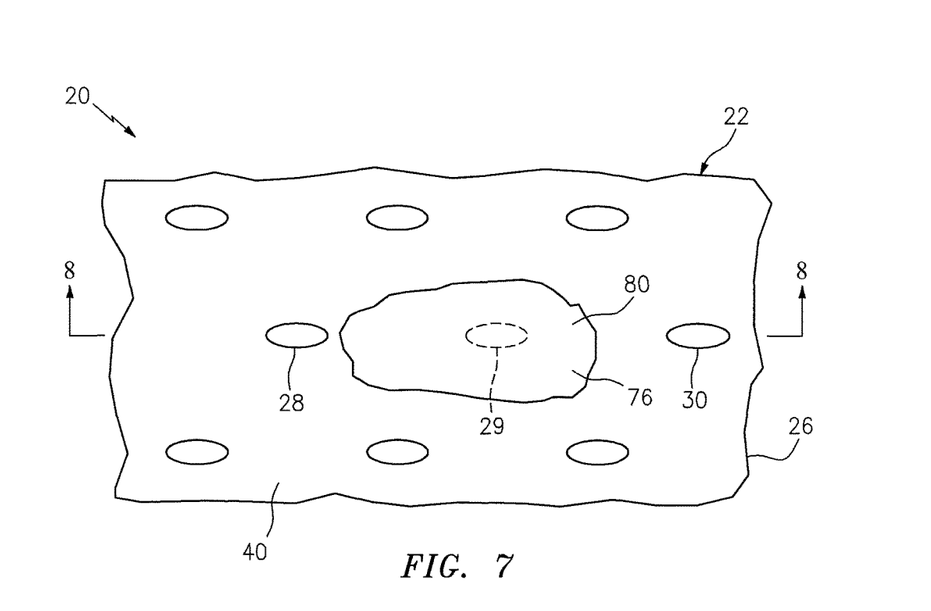
FIG. 7 is an illustration of moldable material applied on the portion of the rotor blade of FIG. 2.
Figure 8:
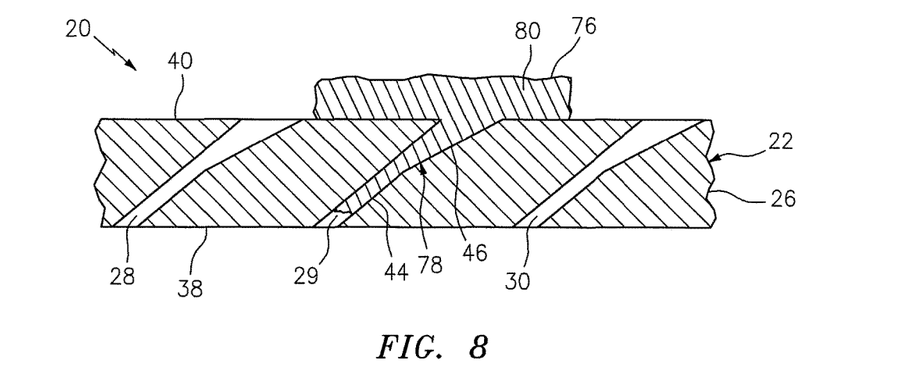
FIG. 8 is a sectional illustration of the moldable material and the portion of the rotor blade of FIG. 7.

Referring to FIGS. 6 to 8, in step 600, the moldable material 76 is applied to at least a portion of the airfoil 22. At least a portion of the moldable material 76, for example, is directed (e.g., injected) into the cooling hole 29. The moldable material 76 may be metered (e.g., with a syringe) such that the material flows partially into the cooling hole 29; e.g., through the diffuser portion 46 and partially into the meter portion 44. The volume of moldable material 76 therefore may be controlled to minimize the amount of the moldable material 76 that may otherwise flow completely through the cooling hole 29 and into the interior cavity 42. Alternatively, the moldable material 76 may be directed to flow completely through the cooling hole 29.

Within the cooling hole 29, the moldable material 76 may conform to at least a portion of a geometry of the cooling hole 29. The moldable material 76 may subsequently change phase from a fluid to a solid (e.g., cure), thereby forming a mold 78 of the respective portion of the cooling hole 29.

Another portion of the moldable material 76 may also be applied to the exterior surface 40 surrounding the cooling hole 29. This portion of the moldable material 76 may subsequently change phase from a fluid to a solid (e.g., cure), thereby forming a base 80 that is integral with the mold 78.

In step 602, the mold 78 is removed from the cooling hole 29. The base 80, for example, may be utilized as a grip and pulled to remove the mold 78 from the cooling hole 29.

Referring to FIGS. 4 to 6, in step 604, the base 80 is arranged on the component support surface 64.

In step 606, the inspection system 50 is used to compare at least a portion of a geometry of the mold 78 to at least a portion of a geometry of a reference model. The reference model may be, or otherwise correspond to, a geometric design-space model from which the cooling hole was formed.

In step 608, the processing system 56 signals the measurement device 54 to map at least a portion of a surface geometry of the mold 78 to provide map data. The projector 72, for example, may project a pattern of alternating parallel lines (e.g., black lines) onto a surface 82 of the mold 78. These lines may be distorted by contours, edges and/or other features of the mold surface 82. One or more images of the lines on the mold surface 82 may be captured with one or more of the cameras 74, and processed with the processing system 56 to provide a surface geometry map (e.g., a 3D contour plot) of the mold 78. The map data may include one or more (e.g., a triangulated mesh of) measurement data points from the surface geometry map.

In step 610, the processing system 56 generates a geometric model of the mold 78 utilizing the map data and the surface geometry map. This geometric model may be generated, for example, by performing a surface fitting to the triangulated mesh of measurement data points. The present invention, however, is not limited to such a surface fitting technique.

In step 612, the processing system 56 compares the geometric model of the mold 78 to the reference model. One or more data points from the geometric model of the mold 78, for example, may be spatially compared to corresponding data points from the reference model to provide model comparison data. This model comparison data may be indicative of geometric differences between the geometric model of the mold 78 and the reference model. The model comparison data therefore may also be indicative of differences between a geometry of the cooling hole 29 and the geometry of the reference model.

Figure 9:
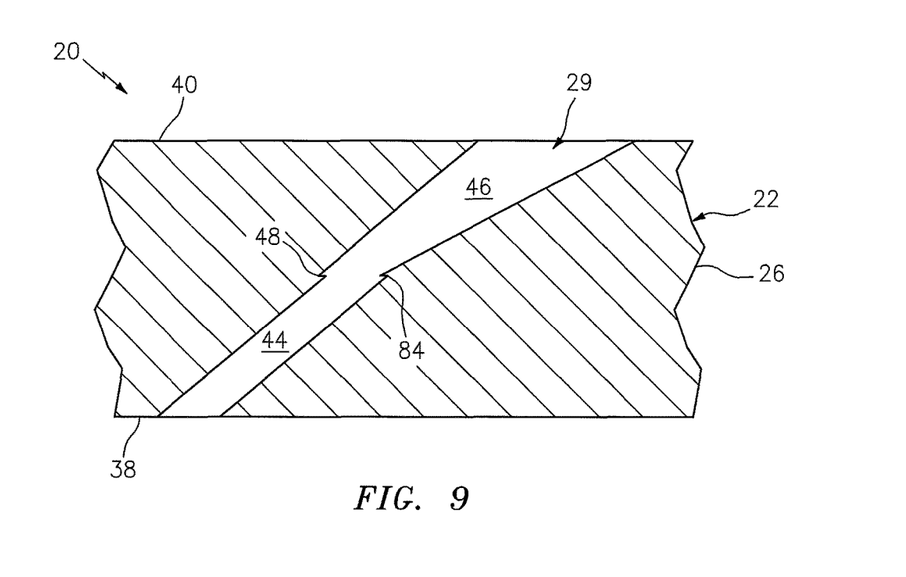
FIG. 9 is a sectional illustration of a portion of an alternate embodiment rotor blade.

In step 614, the processing system 56 processes the model comparison data to determine whether the cooling hole 29 was formed in the airfoil 22 in accordance with the design-space model. The processing system 56, for example, may compare the model comparison data to threshold data to determine whether deviations between the geometry of the cooling hole 29 and the geometry of the reference model are within predetermined tolerances. In this manner, the processing system 56 may determine whether the cooling hole 29 is properly sized and/or shaped. In addition, the processing system 56 may determine whether the meter portion 44 is aligned with the diffuser portion 46 as shown in FIG. 3, or if there is a ridge 84 (e.g., a mismatch) at the junction 48 between the meter portion 44 and the diffuser portion 46 as shown in FIG. 9. Such a ridge 84 may induce flow disturbances within the cooling hole, which may negatively affect its operability.

Figure 10:
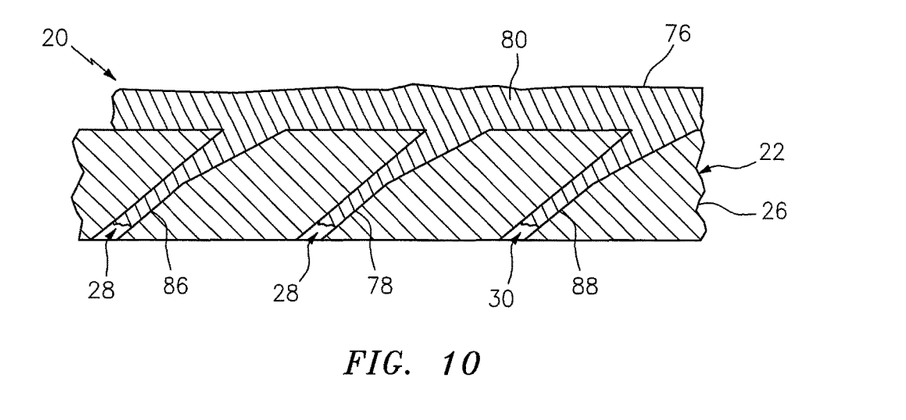
FIG. 10 is a sectional illustration of moldable material applied on the portion of the rotor blade of FIG. 2.

The foregoing method may also be performed for one or more of the cooling holes 28 and 30-36. For example, the foregoing method may be individually repeated for each of the cooling holes 28 and 30-36. Alternatively, referring to FIG. 10, some of the moldable material may also be directed into one or more of the cooling holes (e.g., the holes 28 and 30) during the step 600 to form molds 86 and 88 for those cooling holes 28 and 30. Each of the molds 86 and 88 may subsequently be individually (or collectively) compared to respective reference data.

In some embodiments, a plenum structure may be provided that seals across a portion of the exterior surface 40 and forms a chamber with the airfoil 22. The moldable material may be introduced into the chamber and pressurized against the airfoil, thereby urging the moldable material into one or more of the apertures and/or features present on the airfoil 22 within the bounds of the plenum chamber. In this manner, a plurality of apertures and/or features of the airfoil may be simultaneously molded using the plenum structure.

The present invention also includes a kit for performing the foregoing method. The kit may include a quantity of the moldable material 76 (e.g., the curable material), an injection device (e.g., a syringe, a squeeze tube, etc.) for injecting the moldable material into the aperture(s) being inspected, the inspection system 50, and a computer readable medium storing an electronically readable reference model of the aperture. The computer readable medium may be configured as a hard drive, a disk, a thumb drive or any other type of electronic data storage device. The kit may also include a written document or an electronic document stored on another computer readable medium that provides instructions for performing the removal step 602, or any other of the steps described above.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined within any one of the aspects and remain within the scope of the invention. Accordingly, the present invention is not to be restricted except in light of the attached claims and their equivalents.

What is claimed is:

1. A method for inspecting at least one aperture of a component with curable material and an inspection system, the method comprising:
    injecting at least a portion of the curable material into the aperture, the curable material conforming to at least a portion of the aperture and subsequently curing and forming a mold of at least a portion of the aperture;
    removing the mold from the aperture; and
    comparing at least a portion of a geometry of the mold to at least a portion of a geometry of a reference model for the aperture using the inspection system.

2. The method of claim 1, further comprising determining whether a meter portion of the aperture is aligned with a diffuser portion of the aperture based on the comparison.

3. The method of claim 1, further comprising determining whether there is a ridge at a junction between a meter portion of the aperture and a diffuser portion of the aperture based on the comparison.

4. The method of claim 1, further comprising:
    forming a base with a first portion of the curable material on a surface of the component, the aperture extending into the component from the surface;
    wherein the injecting comprises injecting a second portion of the curable material into the aperture, and
    wherein the removing removes the mold from the aperture using the base.

5. The method of claim 4, further comprising:
    injecting a third portion of the curable material into a second aperture of the component, the curable material conforming to at least a portion of the second aperture and forming a second mold of at least a portion of the second aperture; and
    comparing at least a portion of a geometry of the second mold to at least a portion of a geometry of a second reference model for the second aperture using the inspection system.

6. The method of claim 1, further comprising metering the curable material that is injected into the aperture.

7. The method of claim 1, wherein
    the comparing comprises mapping at least a portion of a surface geometry of the mold with a measurement device to provide map data, and comparing the map data to data from the reference model using a processing device; and
    the inspection system comprises the measurement device and the processing device.

8. The method of claim 7, wherein the measurement device comprises a non-contact measurement device.

9. The method of claim 7, wherein the measurement device comprises one of a full spectrum light measurement device, a monochromatic light measurement device, a laser measurement device, a computed axial tomography scanning device, and an interferometry device.

10. The method of claim 1, wherein the component comprises a turbine engine component.

11. The method of claim 10, wherein the turbine engine component comprises a rotor blade, and the aperture comprises a cooling hole located in an airfoil of the rotor blade.

12. The method of claim 1, wherein the curable material comprises one of a viscous liquid and a viscoelastic fluid.

13. The method of claim 1, wherein the curable material comprises a self-curing material.

14. The method of claim 1, wherein a volume of the curable material is substantially equal to a volume of the cured material.

15. A method for inspecting at least one cooling hole of a turbine engine component with moldable material and an inspection system, comprising:
    directing at least a portion of the moldable material into the cooling hole of the turbine engine component, the moldable material conforming to at least a portion of the cooling hole and subsequently changing phase from a fluid to a solid and forming a mold of the at least a portion of the cooling hole;
    removing the mold from the cooling hole of the turbine engine component; and
    comparing at least a portion of a geometry of the mold to at least a portion of a geometry of a reference model for the aperture using the inspection system;
    wherein a volume of the moldable material as the fluid is substantially equal to a volume of the moldable material as the solid.

16. The method of claim 15, wherein the comparing comprises mapping at least a portion of a surface geometry of the mold with the inspection system to provide map data.

17. The method of claim 16, wherein the comparing further comprises comparing the map data to data from the reference model.

* * * * *